United States Patent
Kamath et al.

(10) Patent No.: US 8,502,859 B2
(45) Date of Patent: Aug. 6, 2013

(54) DETERMINING BUFFER SIZE BASED ON FORWARD ERROR CORRECTION RATE

(75) Inventors: P. Raghavendra Kamath, Bangalore (IN); Ashish Goyal, Bangalore (IN)

(73) Assignee: LifeSize Communications, Inc., Austin, TX (US)

( * ) Notice: Subject to any disclaimer, the term of this patent is extended or adjusted under 35 U.S.C. 154(b) by 286 days.

(21) Appl. No.: 13/090,927

(22) Filed: Apr. 20, 2011

(65) Prior Publication Data

US 2011/0261145 A1 Oct. 27, 2011

(51) Int. Cl.
*H04N 7/15* (2006.01)

(52) U.S. Cl.
USPC .................. 348/14.08; 319/14.09; 319/14.12

(58) Field of Classification Search
USPC .......... 348/14.01–14.16; 375/240.02; 370/352
See application file for complete search history.

(56) References Cited

U.S. PATENT DOCUMENTS

| | | | |
|---|---|---|---|
| 6,728,263 B2 | 4/2004 | Joy et al. | |
| 2010/0104007 A1* | 4/2010 | Lin | 375/240.02 |
| 2010/0202309 A1* | 8/2010 | Suneya | 370/252 |

OTHER PUBLICATIONS

Jonathan Rosenberg, Lili Qiu, Henning Schulzrinne; "Integrating Packet FEC into Adaptive Voice Playout Buffer Algorithms on the Internet". This paper appeared in the Proceedings of IEEE Infocom 2000, Tel Aviv, Israel, Mar. 2000. This version corrects some formatting and typographical errors; Mar. 2000; 10 pages.

U.S. Appl. No. 11/567,060, entitled "Wireless Multimedia Device With Real Time Adjustment of Retry Function and Bit Rate Modulation", by Frantz Lohier and Joachim Nuesch, filed Dec. 5, 2006. 25 pages.

U.S. Appl. No. 12/201,515, entitled "Video Packet Loss Concealment", by Abraham Suissa, Frantz Lohier, and Jennifer Mellor, filed Aug. 29, 2008. 34 pages.

* cited by examiner

*Primary Examiner* — Melur Ramakrishnaiah

(74) *Attorney, Agent, or Firm* — Meyertons Hood Kivlin Kowert & Goetzel, P.C.; Jeffrey C. Hood; Joel L. Stevens

(57) ABSTRACT

Determining a buffer size in a videoconference. In some embodiments, one or more of various different error correction methods may be used in a videoconference. For example, forward error correction (FEC) may be used and/or retransmission of lost packets (ReTxLP) may be used, e.g., based on a packet loss threshold. Where FEC is used, a buffer size of a receiving videoconferencing device may be determined based on the FEC rate. Where ReTxLP is used, a buffer size of the receiving videoconferencing device may be determined based on a retransmission latency.

20 Claims, 13 Drawing Sheets

DETERMINING BUFFER SIZE BASED ON FORWARD ERROR CORRECTION RATE

PRIORITY INFORMATION

This application claims benefit of priority of Indian Application Number 1003/DEL/2010, titled "Videoconferencing System with Improved Forward Error Correction", filed Apr. 27, 2010, whose inventors were P. Raghavendra Kamath and Ashish Goyal, which is hereby incorporated by reference in its entirety as though fully and completely set forth herein.

FIELD OF THE INVENTION

The present invention relates generally to conferencing and, more specifically, to adjusting buffer sizes in a videoconference.

DESCRIPTION OF THE RELATED ART

Videoconferencing may be used to allow two or more participants at remote locations to communicate using both video and audio. Each participant location may include a videoconferencing system for video/audio communication with other participants. Each videoconferencing system may include a camera and microphone to collect video and audio from a first or local participant to send to one or more other (remote) participants. Each videoconferencing system may also include a display and speaker to reproduce video and audio received from remote participant(s). Each videoconferencing system may also be coupled to a computer system to allow additional functionality into the videoconference. For example, additional functionality may include data conferencing (including displaying and/or modifying a document for both participants during the conference).

In some cases, there may be significant packet loss or other undesirable communication issues during a videoconference. Accordingly, improvements in communication for videoconferences are desired.

SUMMARY OF THE INVENTION

Various embodiments are presented of a system and method for adjusting buffer sizes based on various factors, such as forward error correction (FEC) rates or packet retransmission latencies.

More specifically, in a first embodiment, FEC may be used in a videoconference between a first videoconferencing device (e.g., an endpoint or MCU) and a second videoconferencing device. FEC may be used to correct packet loss that occurs in communication between the first videoconferencing device and the second videoconferencing device.

Accordingly, an FEC rate may be determined. The FEC rate may specify the frequency of FEC packets sent in a packet stream transmitted from the first videoconferencing device to the second videoconferencing device. For example, the FEC rate may be 1 FEC packet per 10 data packets (e.g., RTP packets). Based on the FEC rate, a buffer size of a buffer (e.g., a video jitter buffer) may be determined automatically. For example, a first number of FEC packets over a second number of data packets may be determined (e.g., 1 and 10 from the example above). Accordingly, the buffer size may be at least the sum of the first number (e.g., 1) and the second number (e.g., 10). In some embodiments, the buffer may be determined as an amount that is at least 5% greater than the sum in order to ensure that there is enough time to reconstruct any lost packets using the FEC packet before providing the packets for decoding. However, other percentages and methods are envisioned, such as 10%, 15%, 20%, a static or calculated amount of time (e.g., 5 ms, 10 ms, 15 ms, 20 ms, 50 ms, etc.).

Once the buffer size is determined, packets may be received to the buffer, e.g., including the FEC packets, any lost packets may be reconstructed, and the packets in the buffer may be sent for playback, e.g., via a decoder. For example, the packets may be video packets that are sent to a video decoder for display on a videoconferencing display. Thus, in one embodiment, the received packets and the FEC packets may be received in a jitter buffer without using an FEC buffer, although in alternate embodiments, the FEC packets may be received separately in an FEC buffer.

The method may be performed at various times, e.g., before the videoconference, upon initiation of the videoconference, upon initiation of FEC between the two videoconferencing devices (which could be initiated at any time, or at a plurality of different times during the videoconference), upon any modification of FEC rates, periodically, etc. Thus, the method described above may be performed once or a plurality of times (e.g., in a dynamic fashion) for a videoconference.

In a second embodiment, retransmission of lost packets (ReTxLP) may be used in a videoconference between a first videoconferencing device and a second videoconferencing device. Accordingly, a retransmission latency between the first videoconferencing device and the second videoconferencing device may be determined. For example, the retransmission latency may be determined by determining a round trip time (RTT) between the first videoconferencing device and the second videoconferencing device. Accordingly, a buffer size of a buffer may be determined based on the retransmission latency. For example, the buffer size may be at least the size of the RTT. More specifically, the buffer size may be at least a fixed amount (e.g., of time) greater than the RTT between the first videoconferencing device and the second videoconferencing device, e.g., to allow the second videoconferencing device to request a lost packet, the first videoconferencing device to retransmit the lost packet, and the second videoconferencing device to receive the lost packet and place it in its proper place in the buffer. Typically, the additional amount of time may be dependent on hardware and/or software of the videoconferencing devices and independent of the latency. For example, this additional delta amount of time may be used to allow for application level processing times for detecting, requesting, and retransmitting a lost packet (among other possibilities). In some embodiments, the additional amount of time may be 5 ms, 10 ms, 15 ms, 20 ms, 25 ms, 50 ms, 100 ms, etc. However, other methods are envisioned, e.g., where the buffer size is a percentage greater than the determined RTT, such as 5%, 15%, 20%, etc.

Similar to above, the buffer may be a jitter buffer of the second videoconferencing device and the received packets may be used for playback of the videoconference. Also similar to above, the method may be performed once or a plurality of times for the videoconference. For example, the method may be performed before the videoconference, upon initiation of the videoconference, upon initiation of ReTxLP between the two videoconferencing devices (which could be initiated at any time, or at a plurality of different times during the videoconference), periodically, etc. Thus, the method described above may be performed once or a plurality of times (e.g., in a dynamic fashion) for a videoconference.

BRIEF DESCRIPTION OF THE DRAWINGS

A better understanding of the present invention may be obtained when the following detailed description is considered in conjunction with the following drawings, in which.

Figure 1:
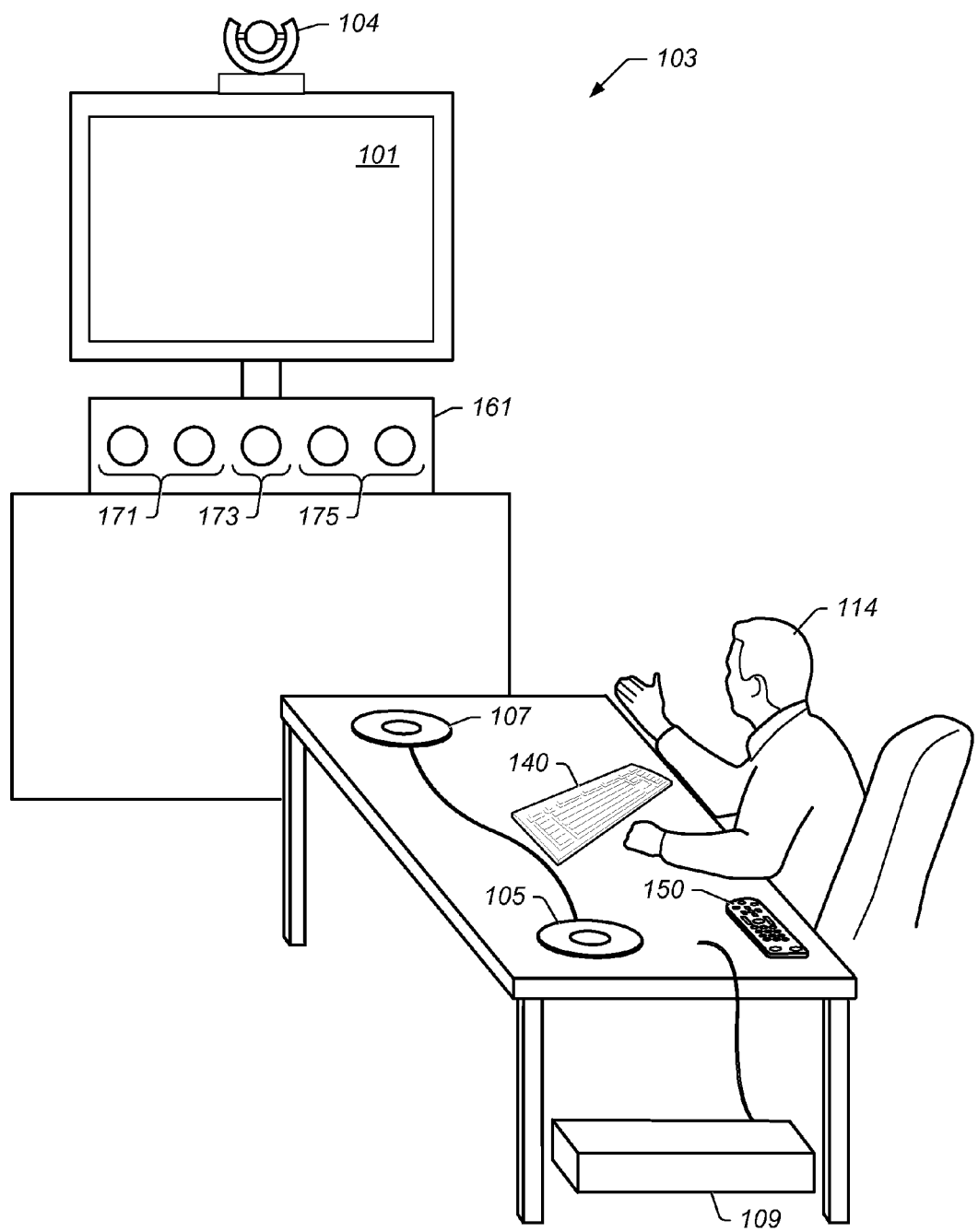
FIGS. 1 and 2 illustrate exemplary videoconferencing system participant locations, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. patent application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, or other device or combinations of devices. In general, the term "computer system" can be broadly defined to encompass any device (or combination of devices) having at least one processor that executes instructions from a memory medium.

Figure 2:

FIGS. 1 and 2—Exemplary Participant Locations

FIG. 1 illustrates an exemplary embodiment of a videoconferencing participant location, also referred to as a videoconferencing endpoint or videoconferencing system (or videoconferencing unit). The videoconferencing system 103 may have a system codec 109 to manage both a speakerphone 105/107 and videoconferencing hardware, e.g., camera 104, display 101, speakers 171, 173, 175, etc. The speakerphones 105/107 and other videoconferencing system components may be coupled to the codec 109 and may receive audio and/or video signals from the system codec 109.

In some embodiments, the participant location may include camera 104 (e.g., an HD camera) for acquiring images (e.g., of participant 114) of the participant location. Other cameras are also contemplated. The participant location may also include display 101 (e.g., an HDTV display). Images acquired by the camera 104 may be displayed locally on the display 101 and/or may be encoded and transmitted to other participant locations in the videoconference. In some embodiments, images acquired by the camera 104 may be encoded and transmitted to a multipoint control unit (MCU), which then provides the encoded stream to other participant locations (or videoconferencing endpoints)

The participant location may further include one or more input devices, such as the computer keyboard 140. In some embodiments, the one or more input devices may be used for the videoconferencing system 103 and/or may be used for one or more other computer systems at the participant location, as desired.

The participant location may also include a sound system 161. The sound system 161 may include multiple speakers including left speakers 171, center speaker 173, and right speakers 175. Other numbers of speakers and other speaker configurations may also be used. The videoconferencing system 103 may also use one or more speakerphones 105/107 which may be daisy chained together.

In some embodiments, the videoconferencing system components (e.g., the camera 104, display 101, sound system 161, and speakerphones 105/107) may be coupled to a system codec 109. The system codec 109 may be placed on a desk or on the floor. Other placements are also contemplated. The system codec 109 may receive audio and/or video data from a network, such as a LAN (local area network) or the Internet. The system codec 109 may send the audio to the speakerphone 105/107 and/or sound system 161 and the video to the display 101. The received video may be HD video that is displayed on the HD display. The system codec 109 may also receive video data from the camera 104 and audio data from the speakerphones 105/107 and transmit the video and/or audio data over the network to another conferencing system, or to an MCU for provision to other conferencing systems. The conferencing system may be controlled by a participant or user through the user input components (e.g., buttons) on the speakerphones 105/107 and/or input devices such as the keyboard 140 and/or the remote control 150. Other system interfaces may also be used.

In various embodiments, the codec 109 may implement a real time transmission protocol. In some embodiments, the codec 109 (which may be short for "compressor/decompressor" or "coder/decoder") may comprise any system and/or method for encoding and/or decoding (e.g., compressing and decompressing) data (e.g., audio and/or video data). For example, communication applications may use codecs for encoding video and audio for transmission across networks, including compression and packetization. Codecs may also be used to convert an analog signal to a digital signal for transmitting over various digital networks (e.g., network, PSTN, the Internet, etc.) and to convert a received digital signal to an analog signal. In various embodiments, codecs may be implemented in software, hardware, or a combination of both. Some codecs for computer video and/or audio may utilize MPEG, Indeo™, and Cinepak™, among others.

In some embodiments, the videoconferencing system 103 may be designed to operate with normal display or high definition (HD) display capabilities. The videoconferencing system 103 may operate with network infrastructures that support T1 capabilities or less, e.g., 1.5 mega-bits per second or less in one embodiment, and 2 mega-bits per second in other embodiments.

Note that the videoconferencing system(s) described herein may be dedicated videoconferencing systems (i.e., whose purpose is to provide videoconferencing) or general purpose computers (e.g., IBM-compatible PC, Mac, etc.) executing videoconferencing software (e.g., a general purpose computer for using user applications, one of which performs videoconferencing). A dedicated videoconferencing system may be designed specifically for videoconferencing, and is not used as a general purpose computing platform; for example, the dedicated videoconferencing system may execute an operating system which may be typically streamlined (or "locked down") to run one or more applications to provide videoconferencing, e.g., for a conference room of a company. In other embodiments, the videoconferencing system may be a general use computer (e.g., a typical computer system which may be used by the general public or a high end computer system used by corporations) which can execute a plurality of third party applications, one of which provides videoconferencing capabilities. Videoconferencing systems may be complex (such as the videoconferencing system shown in FIG. 1) or simple (e.g., a user computer system 200 with a video camera, input devices, microphone and/or speakers such as the videoconferencing system of FIG. 2). Thus, references to videoconferencing systems, endpoints, etc. herein may refer to general computer systems which execute videoconferencing applications or dedicated videoconferencing systems. Note further that references to the videoconferencing systems performing actions may refer to the videoconferencing application(s) executed by the videoconferencing systems performing the actions (i.e., being executed to perform the actions).

The videoconferencing system 103 may execute various videoconferencing application software that presents a graphical user interface (GUI) on the display 101. The GUI may be used to present an address book, contact list, list of previous callees (call list) and/or other information indicating other videoconferencing systems that the user may desire to call to conduct a videoconference.

Note that the videoconferencing system shown in FIGS. 1 and 2 may be modified to be an audioconferencing system. For example, the audioconference could be performed over a network, e.g., the Internet, using VOIP. The audioconferencing system, for example, may simply include speakerphones 105/107, although additional components may also be present. Additionally, note that any reference to a "conferencing system" or "conferencing systems" may refer to videoconferencing systems or audioconferencing systems (e.g., teleconferencing systems). In the embodiments described below, the conference is described as a videoconference, but note that the methods may be modified for utilization in an audioconference.

Figure 3A:
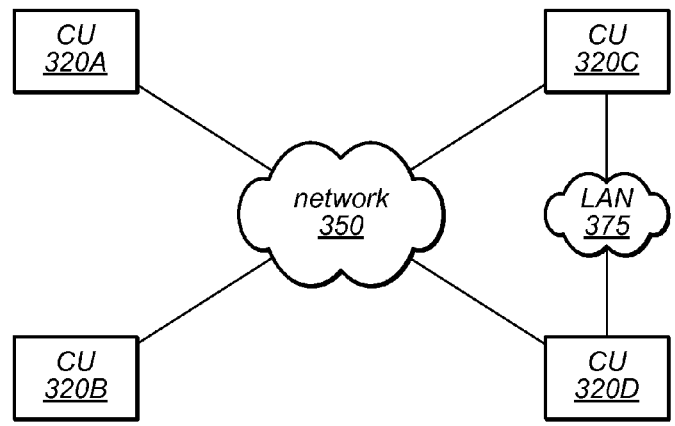
FIGS. 3A and 3B illustrate exemplary conferencing systems coupled in different configurations, according to some embodiments.
Figure 3B:
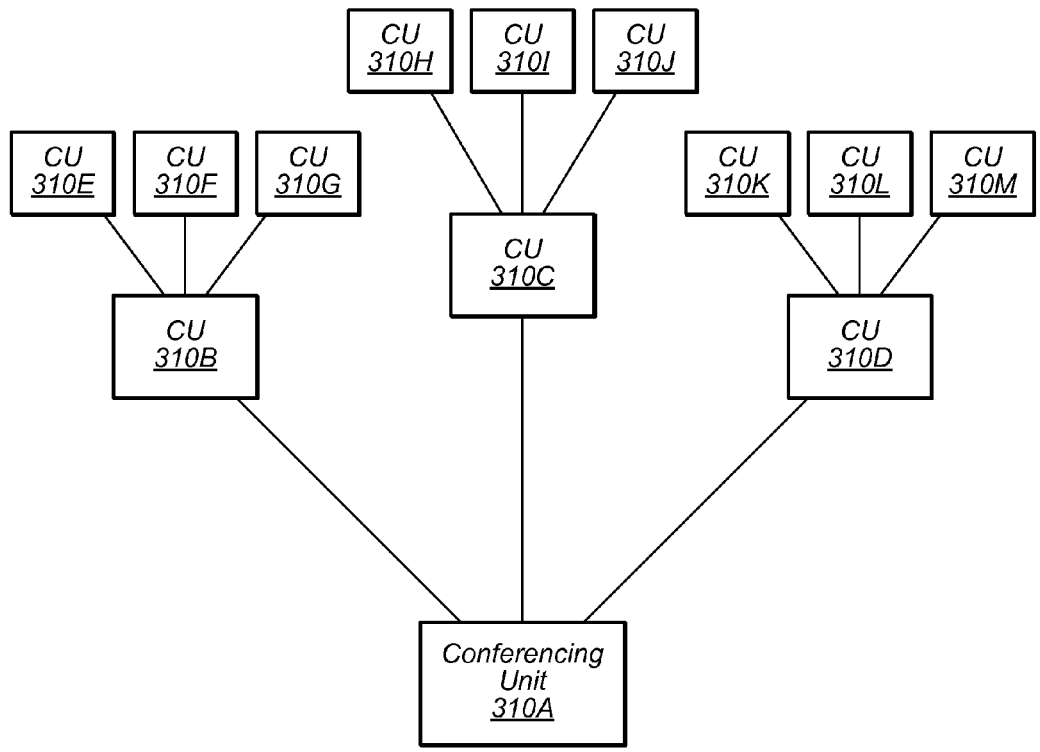

FIGS. 3A and 3B—Coupled Conferencing Systems

FIGS. 3A and 3B illustrate different configurations of conferencing systems. The conferencing systems may be operable to perform the methods described herein. As shown in FIG. 3A, conferencing systems (CUs) 320A-D (e.g., videoconferencing systems 103 described above) may be connected via network 350 (e.g., a wide area network such as the Internet) and CU 320C and 320D may be coupled over a local area network (LAN) 375. The networks may be any type of network (e.g., wired or wireless) as desired.

FIG. 3B illustrates a relationship view of conferencing systems 310A-310M. As shown, conferencing system 310A may be aware of CU 310B-310D, each of which may be aware of further CU's (310E-310G, 310H-310J, and 310K-310M respectively). CU 310A may be operable to perform the methods described herein. In a similar manner, each of the other CUs shown in FIG. 3B, such as CU 310H, may be able to perform the methods described herein, as described in more detail below. Similar remarks apply to CUs 320A-D in FIG. 3A.

Figure 4:
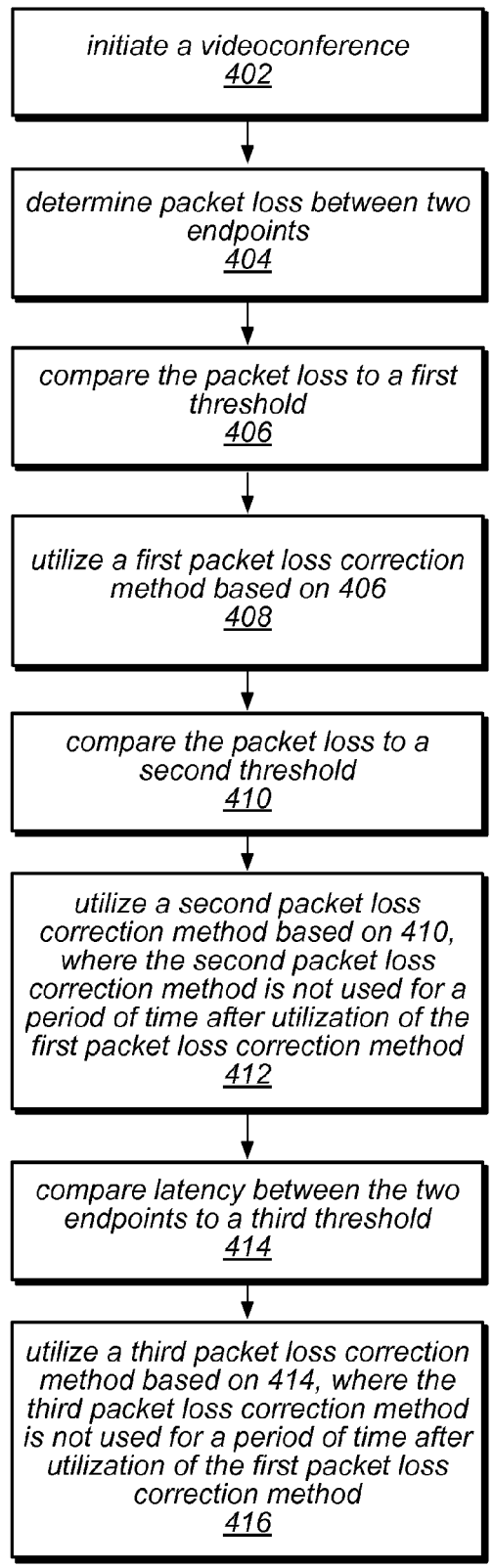
FIG. 4 is a flowchart diagram illustrating an embodiment of a method for selecting between various methods for reducing packet loss.

FIG. 4—Selecting Packet Loss Correction Method

FIG. 4 illustrates a method for selecting between various methods for reducing packet loss. The method shown in FIG. 4 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 402, a videoconference may be initiated or performed between a plurality of participants at respective participant locations. More specifically, the conference may be initiated between a first participant using a first endpoint (e.g., at a first participant location) and a plurality of other participants using other endpoints (e.g., at other participant locations). Thus, endpoints may be similar to those described above regarding FIGS. 1 and 2, although other variations are envisioned. The videoconference may be established according to any of a variety of methods, e.g., the one described in patent application Ser. No. 11/252,238, which was incorporated by reference above. The videoconference may utilize an instant messaging service or videoconferencing service over the Internet, as desired.

In some embodiments, a multipoint control unit (MCU) may perform the first videoconference between the plurality of videoconference endpoints. For example, the MCU may perform decoding and encoding operations on video information transmitted in the first videoconference between the plurality of videoconferencing endpoints. The MCU may be incorporated in one of the endpoints or conferencing units participating in the videoconference or may be separate from the endpoints (e.g., a stand-alone MCU), as desired.

In 404, packet loss may be determined between a first videoconferencing device and a second videoconferencing device. As used herein, a "videoconferencing device" may refer to any of the devices that are participating in the videoconference, such as an endpoints (or conferencing units), the MCU, etc. In one embodiment, the packet loss may be determined by the receiving videoconferencing device, e.g., by a receiving videoconferencing endpoint. For example, the receiving endpoint may determine that a certain percentage of the packets sent from a sending videoconferencing device are being lost for whatever reason. According to various embodiments, the sending and receiving videoconferencing devices may be any of the videoconferencing devices in the videoconference. For example, the sending endpoint may be the MCU. Alternatively, the receiving endpoint may be the MCU. However, it should be noted that neither of the endpoints may be an MCU, and that the packet loss may be detected between two other endpoints of the videoconference. Thus, during the videoconference, packet loss may be detected for an endpoint in the videoconference.

In response to the detection of the packet loss, a packet loss correction method may be implemented. For example, in 406, the degree of packet loss (e.g., the percentage of packet loss) may be compared to a first threshold value. The threshold value may be any of various values, e.g., 1%, 5%, 10%, 20%, 50%, etc. In some particular embodiments, the threshold value may be a lower value, e.g., 5%. It should also be noted that the threshold may be a static value or may be a dynamic value, as desired. For example, the threshold may be set statically at a specific value. Alternatively, the first threshold value may be set dynamically during the videoconference, based on current communication characteristics. In further embodiments, the threshold value may be specified or changed between videoconferences (e.g., but not during, as in the dynamic method described above). According to various embodiments, the first threshold value may be changed, e.g., by an administrator or automatically in response to network conditions.

In 408, a first packet loss correction method may be implemented to correct the packet loss, based on the comparison in 406 (e.g., where the threshold value is exceeded). For example, the first packet loss correction method may attempt to modify the transmission rate of the sending videoconferencing endpoint. In more detail, the first packet loss avoidance method (referred to herein as "auto bandwidth detection" or ABWD) may determine the actual possible bandwidth between two endpoints in the videoconference (A,B) with videoconference information or media being sent from endpoint A to endpoint B. In one embodiment, using ABWD, the packet loss as experienced at endpoint B may be determined as well as how much endpoint A must send to avoid any packet loss. For example, the packet loss information may be sent from endpoint B to endpoint A and endpoint A may determine the correct transmission rate from this packet loss information. This mechanism may allow a videoconference to proceed with minimal packet loss irrespective of the initially specified or determined bandwidth for the videoconference. In one embodiment, the first packet loss correction may be used at any point of the videoconference when the packet loss is above the first threshold value.

As one example for operation of ABWD, assume that endpoint A in the example above has an upload capacity of 512 kbps (e.g., as provided from his service provider). Whenever A attempts to upload videoconference information at a rate beyond this limit, the router/switch at the service provider will throttle transmitted packets, leading to packet loss. In the example where the videoconference is set at a 1 Mbps call, there will be a 50% of packet loss for any receiving endpoint (e.g., B above). Thus, from this high packet loss, ABWD may determine that the available or allotted bandwidth of A is half of the rate of the videoconference. Alternatively, endpoint A may be able to simply provide the maximum bandwidth, and the detection may be performed automatically.

In various embodiments, the receiving endpoint could request the calling side to downspeed to 512 Kbps. Alternatively, the receiving endpoint may provide its packet loss to the sending endpoint, and the sending endpoint may use this information to change its transmittal rate. Accordingly, ABWD may attempt to ensure that packet loss is not caused by an attempt to transmit at a rate higher than that possible for one of the endpoints. Said another way, using ABWD, the transmission rate is set to approximately the line speed, and there may not be any packet loss because of the policies of the service provider. Note that there can still be packet loss, but that would be for other reasons, e.g., transmission loss, congestion, etc. In some embodiments, another packet loss correction method (e.g., the second one involving FEC) may be used to correct such transmission errors.

In 410, the packet loss (e.g., the same packet loss determined in 404 or a different, current packet loss, as desired) may be compared to a second threshold.

In 412, a second packet loss correction method may be utilized based on the comparison in 410. More specifically, the second packet loss correction method may be used when it is above the second threshold. The second packet loss correction method may utilize FEC, e.g., via FEC packets. FEC packets may be defined in the manner used in RFC 2733, which is hereby incorporated by reference as though set forth in its entirety herein. Utilization of FEC may be based on an FEC window size. As used herein, "FEC window size" may refer to the number of information packets (e.g., RTP packets) over which the protection operation is performed. The FEC window size may also directly specify the overhead (i.e., the transport overhead) involved. For example, an FEC window size of 10 implies an overhead of 10%, e.g., that one FEC packet is sent for every 10 RTP packets. By transmitting FEC packets along with regular video RTP packets, lost packets may be recovered in order to provide the full videoconferencing data (e.g., video and audio) to the receiving endpoint. More specifically, the FEC packets may include redundancy information (e.g., an average value of previous or future packets) and may be usable for recovering any lost packets. However, note that such correction may be provided for video packets and may not be for audio packets, although embodiments are envisioned where both audio and video packets (and/or any other types of packets) may be corrected using FEC.

As indicated above, the second packet loss correction method may be used to reduce (or correct) transmission or congestion packet loss, among other possibilities (as opposed to bandwidth restrictions, corrected by ABWD above). Accordingly, when, at the receiving endpoint, the packet loss is above the FEC threshold and ABWD is not active, it may request that FEC be utilized and send the appropriate message to the sending endpoint, which may begin to introduce FEC based on its own determination. In such embodiments, the sending endpoint may be a passive spectator and may respond to the receiving endpoint's requests for introduction/removal of FEC. However, in alternative embodiments, the receiver may send the packet loss and the sender may perform the determination of whether to implement the second packet loss correction method based on that packet loss.

Note that in some embodiments, the second threshold may specify a minimal packet loss threshold (e.g., 0.1%, 0.5%, 1%). Thus, if the current packet loss is minimal (e.g., to a degree that the packet loss is acceptable to a viewer) or non-existent, neither FEC nor ABWD may be used. However, if it is above the threshold and ABWD is not active, FEC may provide benefits (e.g., result in provision of better video with less artifacts) despite its overhead cost. The term "FEC kicking in" is used to refer to enabling Forward Error Correction in the videoconference. This represents the event that the receiver detects some amount of packet loss and requests the sender to introduce FEC packets in the video stream so that it may then recover lost packets. When the sender actually starts adding FEC packets, one can say that "FEC has kicked in".

In some embodiments, a third packet loss correction method may be used. For example, the third packet loss correction method may involve retransmission of lost packets (ReTxLP), and may be implemented as described below with respect to FIG. 5. More specifically, in 414, the latency between the two endpoints may be determined, and in 416, if the latency is below a third threshold, ReTxLP may be utilized in 416.

Note that the two of the packet loss correction methods above (FEC and ReTxLP) may compete with the first packet loss correction method (ABWD, which may be referred to as a "packet loss avoidance method"). In other words, the second and third packet loss correction methods may be competing mechanisms for avoiding packet loss with respect to the first packet loss correction method, though they may resolve separate issues. Accordingly, in some embodiments, the method may ensure that there is no scenario where either of the second and third packet loss correction methods are trying to solve the same problem (e.g., thus making the videoconference transmission worse) as the first packet loss correction method. Accordingly, when the first method (ABWD) is used, the other two methods may be simultaneously switched off. Additionally, a "quiet period" may be used following an ABWD action. During this quiet period, FEC and ReTxLP may not be allowed to be used. This may ensure that FEC and ReTxLP are only used after there is some stability in the network after the ABWD method is used. In some embodiments, ABWD will trigger itself without regard for presence of any ReTxLP/FEC. Accordingly, in this embodiment, ABWD will be the primary mechanism of avoiding packet loss.

Thus, in one particular embodiment, whenever the packet loss exceeds the first threshold, ABWD may be used to downspeed the sending endpoint. In this, ABWD may act as if FEC does not exist. Following an ABWD action, FEC and/or ReTxLP may be switched off or disallowed for a small amount of time to make sure that ABWD settles (e.g., to ensure that the current packet loss measurement is accurate after the change in transmission bandwidth). Following this quite period, the adaptive FEC mechanism may reenable FEC and/or ReTxLP, if needed. Said simply, ABWD may be used only when packet loss is greater than its triggering threshold and anything lesser may be handled by FEC or ReTxLP.

Figure 5:
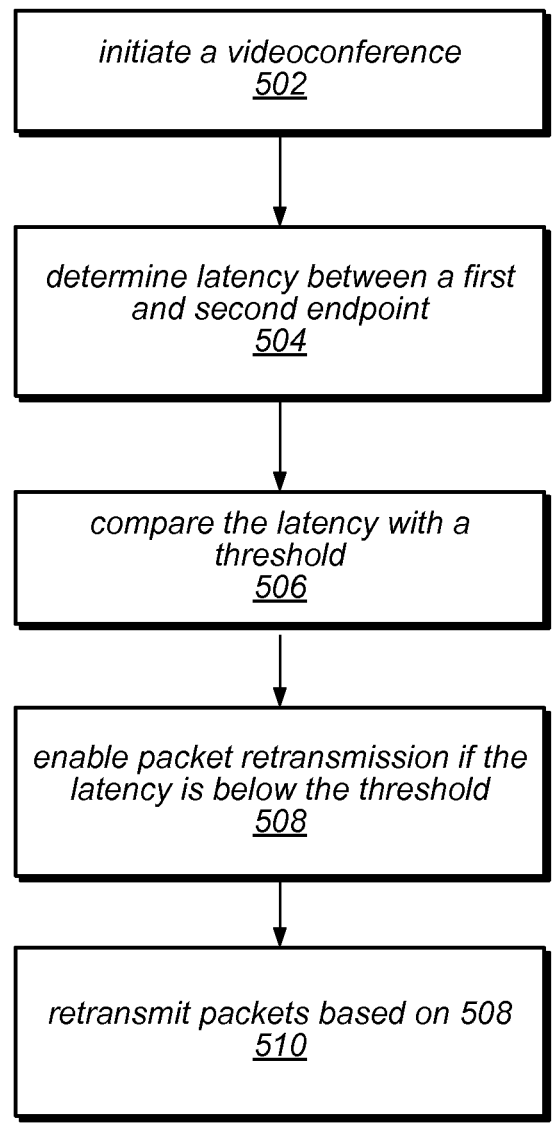
FIG. 5 is a flowchart diagram illustrating an embodiment of a method for performing retransmission of lost packets based on transmission latency.

FIG. 5—Retransmission of Packets Based on Transmission Latency

FIG. 5 illustrates a method regarding retransmission of lost packets based on transmission latency. The method shown in FIG. 9 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 502, a videoconference may be initiated or performed between a plurality of participants via respective videoconference endpoints, and optionally an MCU, as described above, e.g., in 402.

In 504, latency (transmission delay) is determined between the at least two videoconferencing devices that are in communication with each other. For example, latency of a first endpoint that sends videoconferencing information to a second endpoint may be determined. In one embodiment, the latency may be measured by determining the round trip time (RTT) between the first and second endpoint. In some embodiments, this determination may be performed at the outset of the videoconference. However, the determination may be made at any point during the videoconference, and, further, may be performed multiple times, e.g., periodically, such as every few seconds. Additionally, the latency determination may utilize a feedback channel, such as the FEC feedback channel described below.

In 506, the method may determine if the latency is below a threshold. In some embodiments, the latency threshold may be a low number, such as 100 ms, although other thresholds are envisioned, such as 10 ms, 50 ms, 200 ms, 500 ms, etc.

In 508, if the latency falls within the threshold, an "ReTxLP" (retransmission of lost packets) may be enabled. When this feature is enabled, whenever packet loss is suffered, a request may be submitted (e.g., by the second endpoint) for the remote site (e.g., the first endpoint) to retransmit that particular packet. Such a feature may be implemented with or without FEC, as desired. More specifically, since FEC and ReTxLP work independently of each other, both may be operated at the same time, or not, as desired. For example, it may happen that ReTxLP is effective enough to maintain 0% packet loss and FEC is not used. Alternatively, ReTxLP may not correct for 100% of the lost packets and accordingly, FEC may be used to capture the remaining lost packets. Thus, in some embodiments, both FEC and ReTxLP may be operated simultaneously.

Accordingly, in 510, the remote videoconferencing device may transmit any requested missing packets. In some embodiments, the retransmitted packets may be received to a buffer, such as the jitter buffer discussed in FIG. 7 below. Once in the jitter buffer, the packets may be reordered such that the newly received packets are placed in the correct position within the jitter buffer for playback.

Note that this particular embodiment may only be effective on certain networks or under special circumstances. However, under these conditions, it may be possible to recover a significant portion of the lost packets, e.g., recovering up to 10% packet loss.

If the latency does not fall within the threshold, then it may not be advisable to enable ReTxLP. Thus, if the transmission delay is already greater than a certain amount, then there may be insufficient time in the videoconference (to allow for real time bi-directional communication) to retransmit lost packets. In other words, unless the latency is low enough, the use of ReTxLP may cause a noticeable delay to the participants in the videoconference.

The method described above may be performed only at the outset of the videoconference (or at other times, e.g., when packet loss is determined) or may be performed dynamically or periodically, as desired. For example, the method described above may be performed every few seconds and so ReTxLP may be toggled on and off based on the changing latency (e.g., whether the current latency is below the threshold). In further embodiments, the determination may be performed based on other factors, such as packet loss, e.g., in a dynamic fashion.

Figure 6:
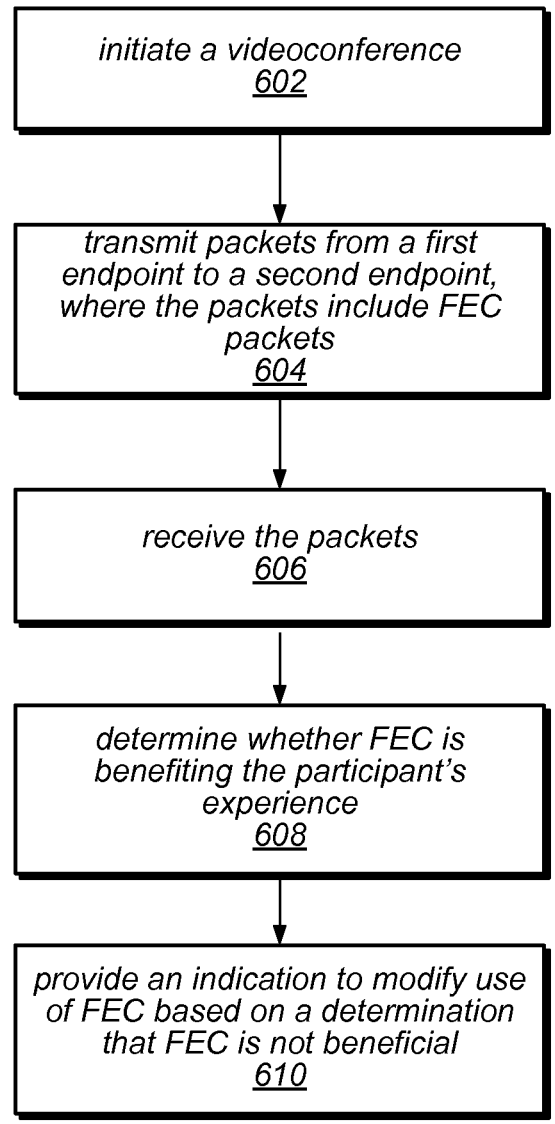
FIG. 6 is a flowchart diagram illustrating an embodiment of a method for dynamically using FEC during a videoconference.

FIG. 6—Dynamic Use of FEC During a Videoconference

FIG. 6 illustrates a method for dynamically using FEC during a videoconference. The method shown in FIG. 6 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 602, a videoconference may be initiated or performed between a plurality of participants via respective videoconference endpoints, and optionally an MCU, as described above, e.g., in 402.

During the videoconference, in 604, packets (e.g., RTP packets which encode video) may be transmitted from a first videoconferencing device (e.g., a first endpoint) to a second videoconferencing device (e.g., a second endpoint). Note that the transmitted packets may include FEC packets. Thus, in some embodiments, in 704, FEC may be used to correct packet loss (e.g., from a first endpoint to a second endpoint) in the videoconference. The use of FEC may be initiated under any of various circumstances, such as those described above regarding FIG. 4.

In 606, the second videoconferencing device may receive the packets.

In 608, the second videoconferencing device may make a determination as to whether the FEC is benefitting the corresponding participant's experience (e.g., whether the FEC is doing a "good job") or whether FEC is not having a significant effect (e.g., whether the packet loss is still at the same rate, if the video or audio quality has not improved, etc.). As can be appreciated, a receiver may be the best entity to determine when it requires FEC to be introduced by the sender and when it needs to be discontinued or modified by the sender. In contrast, a sender is not in as good of a position to determine whether FEC is beneficial. In other words, a sender may not be able to effectively decide whether FEC is useful, e.g., whether the window size it has chosen or is using is effective.

In further embodiments, the determination may involve determining a change in type of the FEC being used. For example, there may be a plurality of different types of FEC (e.g., each implementing FEC in different manners) that may be used to correct packet loss. Accordingly, the second videoconferencing device may be configured to detect the actual kind of packet loss and may determine a type of FEC that may be better, or at least that a type change should occur. Thus, in one embodiment, FEC types may be associated with types of packet loss, and the appropriate type of FEC may be selected based on the determined type of packet loss.

In preferred embodiments, the determination may be performed in an automatic fashion by the second videoconferencing device performing calculations. In some embodiments, these calculations or determination may be performed constantly (e.g., in a periodic fashion) during the videoconference by the second videoconferencing device. For example, the second videoconferencing device may determine a type or kind of packet loss. More specifically, in one embodiment, if there are double/triple packet losses (packet loss of two/three consecutive packets), then the window size may need to be changed. As another possibility, where there two consecutive packets are lost (e.g., since Internet packet loss can be bursty), the FEC type may change to an odd/even FEC method (e.g., where there are two FEC packets per set of data packets, one for even packets and one for odd packets) rather than a serial FEC method, although other types of patterns are envisioned. As another case, if the lost packet recovery happens too late, the amount of time that it was late by and/or how often this missed recovery occurs may be important, e.g., for selecting a type of FEC to be used.

In 610, if the second videoconferencing device determines that the use of FEC is not having a significant impact, the second videoconferencing device may request that the first videoconferencing device (e.g., the sending or transmitting endpoint) cease to use FEC, thereby avoiding the overhead of FEC (typically around 10%), or change how the FEC is currently being used. For example, the second videoconferencing device may request a different window size or request use of a different type of FEC, as desired. The second videoconferencing device may provide such a request or indication via an FEC feedback channel described below. If the second videoconferencing device determines that the use of FEC is having a significant impact, the second videoconferencing device may not change or request anything, and the current use of FEC may continue.

Note that the second videoconferencing device may also use the determination or calculations to determine when to start the use of FEC, e.g., similar to that described in FIG. 4. If the second videoconferencing device determines that FEC should be started, it may transmit such a request to the transmitting videoconferencing device.

Figure 7:
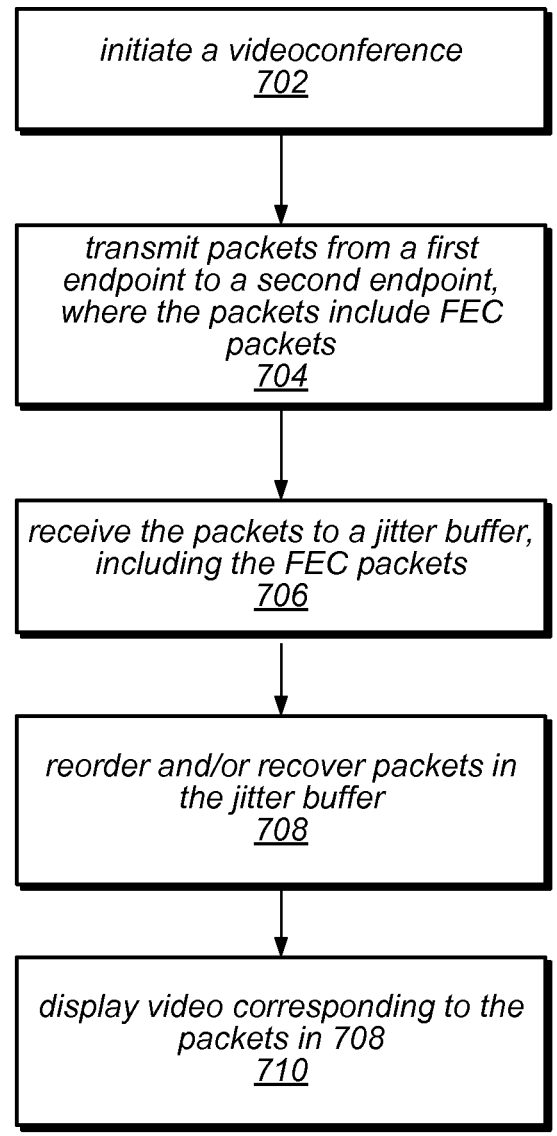
FIG. 7 is a flowchart diagram illustrating an embodiment of a method for using a video jitter buffer for packet loss correction in a videoconference.

FIG. 7—Utilizing Jitter Buffer for Packet Loss Correction in a Videoconference

FIG. 7 illustrates a method for using a video jitter buffer for packet loss correction in a videoconference. The method shown in FIG. 7 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 702, a videoconference may be initiated or performed between a plurality of participants via respective videoconference endpoints, and possibly an MCU, as described above, e.g., in 402.

During the videoconference, in 704, packets (e.g., RTP packets which encode video) may be transmitted from a first videoconferencing device (such as a first endpoint or MCU) to a second videoconferencing device (such as a second endpoint). Note that the transmitted packets may include FEC packets. Thus, in some embodiments, in 604, FEC may be used to correct packet loss (e.g., from a first endpoint to a second endpoint) in the videoconference. The use of FEC may be initiated under any of various circumstances, such as those described above regarding FIG. 4.

In 706, the second videoconferencing device may receive the packets, including the FEC packets. In some embodiments, the second videoconferencing device may receive the packets (or at least a portion of the packets, e.g., the video packets) to a buffer, e.g., referred to as a jitter buffer. The jitter buffer may be used to buffer video packets sequentially before providing them in a consecutive stream to the video decoder. Generally, the jitter buffer is measured in terms of time (e.g., 50-250 ms) or numbers of packets (e.g., 4-30 packets) rather than a size in bytes. In some embodiments, the jitter buffer may be measured in terms of frames, and the method may determine the number of frames from a desired number of packets or time. The jitter buffer may be specifically used as a threshold of time before a packet is sent to an encoder or considered permanently lost (e.g., "given up" on). Note that use of ReTxLP or FEC herein are generally applied to lost packets that have not yet been permanently lost in the sense of the preceding sentence.

In 708, one or more packets in the buffer may be reordered. For example, in case of a packet loss/reordering, e.g., based on FEC packets, the buffer may continue to fill up until the missing packet is recovered or arrives, or the jitter buffer time is filled or exceeded. Thus, the size of the jitter buffer decides the waiting period for a packet to arrive. The size of video jitter buffer also decides how long the FEC module of the endpoint has to recover a lost packet. In some embodiments, it may be desirable to have a jitter buffer that is larger than would normally be necessary in order to properly handle FEC. For example, the jitter buffer size may be increased to allow for packets that are recovered by FEC later than the average case. Further discussion regarding the size of the buffer in relation to FEC rates are provided below, with respect to FIG. 8.

Thus, since the jitter buffer already adequately performs the function of buffering packets and waiting for packets that are reordered, no additional buffering for FEC may be required. Accordingly, the FEC module may work in conjunction with the jitter buffer. If there is a lost packet detected in the jitter buffer, the FEC module may proactively insert any recovered packets into the jitter buffer. However, note that in alternative embodiments a second buffer may be used.

In 710, video corresponding to the packets in the jitter buffer may be displayed, e.g., at the second endpoint.

Note that while descriptions of FIG. 7 (and elsewhere herein) describe the jitter buffer with respect to video packets and video decoders, they may also apply to other types of packets, e.g., audio packets, audio and video packets, or other types of packets, as desired.

Figure 8:
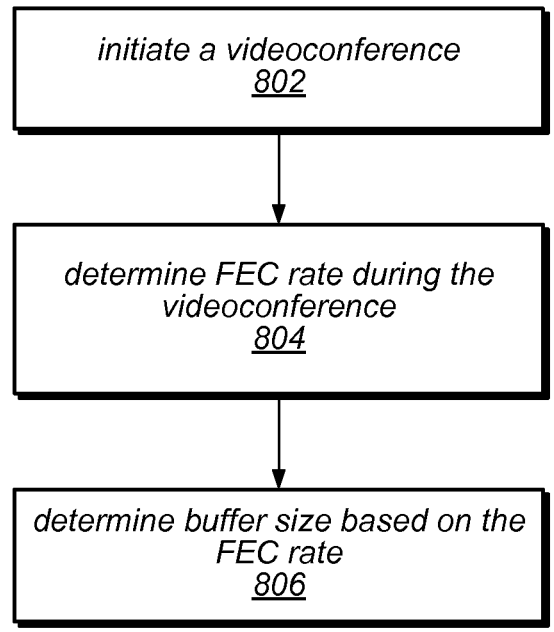
FIG. 8 is a flowchart diagram illustrating an embodiment of a method for determining a buffer size based on an FEC rate in a videoconference.

FIG. 8—Determining Buffer Size Based on FEC Rate

FIG. 8 illustrates a method for determining a buffer size based on an FEC rate in a videoconference. The method shown in FIG. 8 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 802, a videoconference may be initiated or performed between a plurality of participants via respective videoconference endpoints, and possibly an MCU, as described above, e.g., in 402.

In 804, an FEC rate may be determined. The FEC rate may specify the rate at which FEC packets are sent (e.g., 1 FEC packet for every 10 data packets). FEC may be initialized or performed according to any of the methods described above. Accordingly, the FEC rate (e.g., including the FEC window size) may be determined for transmission of packets from a first videoconferencing device to a second videoconferencing device.

In 806, a buffer size of a buffer may be automatically determined based on the FEC rate determined in 806. In one embodiment, the buffer may be the jitter buffer discussed above with respect to FIG. 7. Additionally, the same buffer may be used for receiving video packets and the FEC packets, or different buffers may be used, depending on the embodiment.

More specifically, in one embodiment, a size of buffer may be determined based on the number of packets within the current FEC window. For example, if an FEC packet is sent every 10 packets (e.g., one FEC packet with 10 data packets) then the buffer should be at least 11 packets in size, so that the FEC packet can be used to recover lost packet(s). The buffer may need to be slightly larger than the FEC window size to allow for processing time for recovering the lost packet(s). Accordingly, the method may determine the number of packets within an FEC window and then determine a corresponding size of the buffer (e.g., accounting for any additional processing time). For example, the number of packets may be used to determine a number of frames that the jitter buffer stores or a length of time (e.g., in ms) of the jitter buffer. In order to determine the size of the buffer from the desired number of packets, the bitrate of the videoconference may be needed. For example, at lower bitrates, a frame usually is smaller, so a jitter buffer of 10 packets at 512 Kbps might cause the buffer to be 5 frames long or approximately 150 ms. As another example, at 1 Mbps it may be 100 ms.

The following provides one example for determining a buffer size. In this example, an FEC packet is sent every 10 packets, so there are 11 total packets within the FEC window. Accordingly the buffer size should be at least 11 packets. However to account for processing time, the buffer may be increased (e.g., by a percentage or by a calculated amount to account for the processing time). In this example, the calculated buffer size may be increased by 20% (although other percentages are envisioned, e.g., 5%, 10%, 15%, 25%, etc.) to 13 packets. Thus, in this example, the buffer size of the jitter buffer may be determined based on the FEC rate.

In further embodiments, the buffer size may be determined such that more than one FEC window can be received by the buffer (e.g., so that two FEC windows are received), among other possibilities. After determining the buffer size, FEC may be implemented as described above.

In some embodiments, the determined size of the jitter buffer may not be conducive to real time communication. At that time, discretion may be used to decide whether or not to increase the jitter buffer to make use of benefits of FEC (and/or ReTxLP, described below). For instance, a passive participant may not require real time communication, but may need to be able to see clear video. In this instance, a larger jitter buffer may be acceptable than for a real time participant. Thus, for an active participant in a videoconference, a large jitter buffer (e.g., one that impacts real time communication, such as 200 ms, 500 ms, etc.) may not be used. Thus, there may be a maximum threshold for a jitter buffer for real time participants in a videoconference. Where the determined jitter buffer size is greater than the threshold, the threshold value may be used and/or FEC (or ReTxLP below) may be turned off.

Note that the method described above may be performed at various times according to various embodiments. For example, the buffer size may be determined initially, e.g., before the videoconference, based on an FEC rate that will be used in the videoconference. Alternatively, the buffer size may be determined based on a worst-case FEC rate so that the buffer can accommodate any FEC rate used in the videoconference. In further embodiments, the buffer may be resized each time the FEC rate is changed; thus, the method may be performed dynamically, during run-time, as the FEC rate is changed. The method may be performed periodically (e.g., every few seconds) to determine if the buffer should be resized, or may be performed in response to stimulus, e.g., in response to a request to initiate FEC or change the current FEC rate.

Note also that the method described above may be performed for individual pairs of videoconferencing devices or may be applied to all videoconferencing devices in the videoconference. Thus, according to various embodiments, the FEC rate may vary for different pairs of devices, and accordingly, the buffer size may also vary (e.g., based on the respective FEC rate). Thus, the FEC rate and/or buffer size may be determined for each of a plurality of different pairs of devices. Alternatively, the FEC rate and/or buffer size may not vary for different devices (or may at least apply to more than one pair of videoconferencing devices in the videoconference), and accordingly, the FEC rate and/or buffer size may be determined for all communications (or at least for communication between more than two devices) within the videoconference. For example, the lowest FEC rate (resulting in the largest buffer size) may be used to determine the buffer size for multiple videoconferencing devices in the videoconference.

Thus, by modifying the buffer size based on the FEC rate, FEC may be more effectively used to recover lost packets in a videoconference.

The method of FIG. 8 may be performed by any of various devices. For example, the method of FIG. 8 may be performed by the second videoconferencing device, the MCU, the first videoconferencing device, etc. In embodiments where the buffer size is determined by a device other than the second videoconferencing device, the method may include providing the determined buffer size to the second videoconferencing device for implementation.

Figure 9:
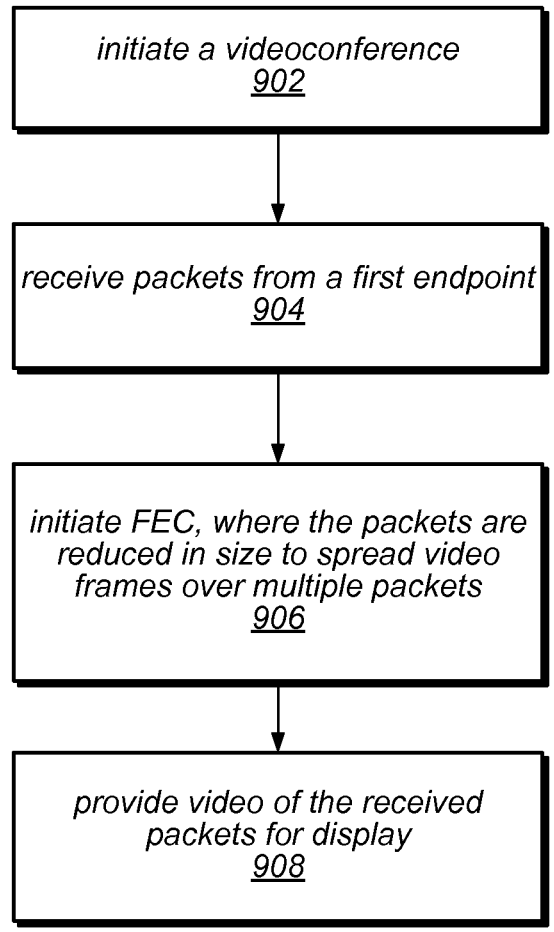
FIG. 9 is a flowchart diagram illustrating an embodiment of a method for using increased packets per frame of video in a videoconference.

FIG. 9—Increased Packets per Frame of Video

FIG. 9 illustrates a method for using increased packets per frame of video in a videoconference. The method shown in FIG. 9 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 902, a videoconference may be initiated or performed between a plurality of participants via respective videoconference endpoints, and possibly an MCU, as described above, e.g., in 402.

During the videoconference, in 904, packets (e.g., RTP packets which encode video) may be transmitted from a first endpoint to a second endpoint. In some embodiments, in 906, FEC may be used to correct packet loss (e.g., from a first endpoint to a second endpoint) in the videoconference. The use of FEC may be initiated under any of various circumstances, such as those described above with respect to FIG. 4.

The transmitted packets may be reduced in size, e.g., to spread out a single video frame over as many packets (e.g., RTP packets) as is technically feasible, although measures short of this are also envisioned. For example, in one embodiment the transmitted packets may be reduced in size to spread out a single video frame to a larger number of packets than would normally be used, but the transmitted packets are not spread out as much as is technically feasible. In some embodiments, the size of the packets may be transmitted at this size throughout the entirety of the videoconference (e.g., in anticipation of use of FEC) or may be reduced in size in response to FEC being used. In various embodiments, once FEC has been used once, they may be reduced in size for the remainder of the videoconference (e.g., regardless of whether FEC is later turned off), or alternatively, they may only be reduced only when FEC is on (i.e., they may be reduced or unreduced as FEC is turned on and off, respectively).

As one specific example, for a 1 Mbps videoconference, one frame of video may normally be transmitted over four packets. However, in this particular example, when the transmitted packets are reduced in size, one frame of video may be transmitted over seven packets. In this example, a packet may normally carry 1440 bytes (subject to MTU limits), but when using the above method, the packet may carry 800-900 bytes, so a frame is split across a larger number of packets. As indicated above, the normal packets may be used when FEC is not enabled, and may be reduced when FEC is enabled.

By decreasing the size of the packets, benefits in recovery of lost packets during the videoconference may be achieved. For example, in videoconferences, there is a limited window of time within which any lost packets need to be recovered since videoconferencing is an application for real time bidirectional communication. Accordingly, the recovery needs to happen in a short duration (e.g., typically less than 150 ms) to avoid impacting the user experience. In some embodiments, it may be desirable to use a scheme that relies on receiving ten consecutive packets and a FEC packet to recover any lost packet. Thus, for a case where an initial packet is lost early in the window, there is a need to wait for additional packets including the FEC packet(s). At some bitrates, waiting for ten packets may cause an unacceptably high delay, thereby impacting the quality of real time communication. Accordingly, by increasing the number of RTP packets generated in the interval (by reducing the size of the packets), i.e., using the decreased size of transmitted packets described above, FEC recovery may be enhanced. Thus, in one embodiment, a single video frame may be spread over a larger number of packets, e.g., in one embodiment as many RTP packets as technically feasible.

In 908, video corresponding to the received packets may be displayed, e.g., at the second endpoint.

The method of FIG. 9 may be particularly applicable to the method of FIG. 8. More specifically, in cases where the buffer size is increased in FIG. 8 due to a particular FEC rate, without spreading the videoconferencing data (e.g., the video data) over more packets, the buffer latency for the participant may be unacceptably high. More specifically, following the example above where where a video frame may be sent over 4 packets normally, where the buffer is initially set at 5 packets, and an FEC rate of 1 in 10 is used, the increase in the buffer size from 5 packets to at least 11 packets would cause a significant change in video latency (e.g., from 1.25 frames/buffer to 2.75 frames/buffer, a change of at least 120%). However, by decreasing the data per packet, the frame may be sent over more packets (e.g., 7 packets in the example above). In this case, after modifying the buffer and changing the data per packet, the latency is not increased as much (e.g., from 1.25 frames/buffer to 1.57 frames/buffer, a change of only 25%). In some embodiments, the size of the data packets (or the ratio of video frames to packets) may be determined based on the determined buffer size, e.g., such that the latency remains the same or remains beneath a latency threshold (e.g., 250 ms). Thus, in some embodiments, the decrease in data size per packet may be performed in response to a change in buffer size according to the method of FIG. 8.

However, the method of FIG. 9 may also be used in cases other than the change in buffer size in FIG. 8. For example, the amount of video data (or data in general) per packet may be performed in order to modify the present overhead of FEC. For example, in an instance where there is 5% packet loss, it may be more desirable to have an FEC rate of 1 in 20 with smaller packets (a 5% overhead) rather than an FEC rate of 1 in 10 with typical packets (a 10% overhead) given the 5% rate of packet loss. Accordingly, the data size of packets may be modified to achieve a desired FEC overhead, among other possibilities.

Figure 10:
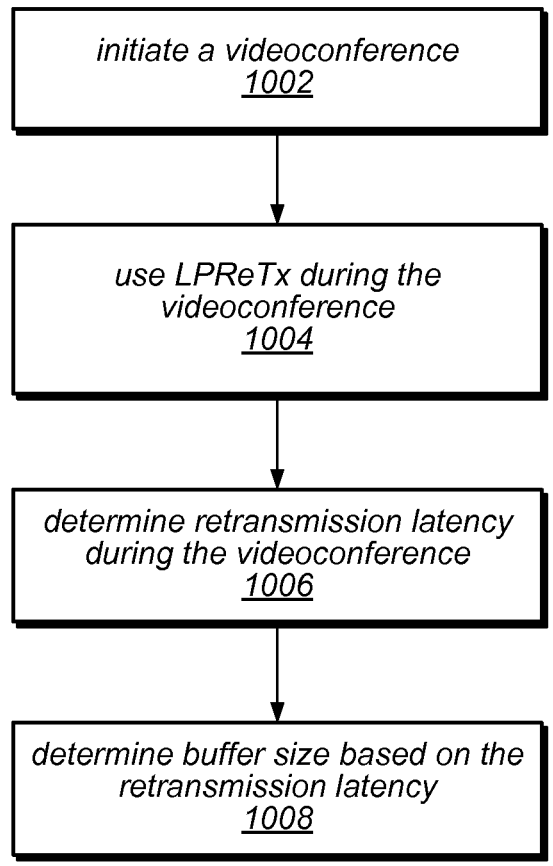
FIG. 10 is a flowchart diagram illustrating an embodiment of a method for determining a buffer size based on retransmission latency.

FIG. 10—Determining Buffer Size Based on Retransmission Latency

FIG. 10 illustrates a method for determining a buffer size based on retransmission latency. The method shown in FIG. 10 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 1002, a videoconference may be initiated or performed between a plurality of participants via respective videoconference endpoints, and possibly an MCU, as described above, e.g., in 402.

In 1004, ReTxLP may be used in the videoconference.

In 1006, a retransmission latency between a first videoconferencing device and a second videoconferencing device may be determined. In one embodiment, the retransmission latency may be determined similar to 504, e.g., by determining the RTT between the first videoconferencing device and the second videoconferencing device. However, the latency may be greater than the RTT since it may also account for the generation of a lost packet. Thus, the retransmission latency may specify the amount of time required to detect a lost packet, send a request to retransmit the lost packet, generate or locate the lost packet, send the lost packet, and/or place the packet in the proper location in the jitter buffer.

In 1008, a buffer size of a buffer may be determined based on the retransmission latency. More specifically, in order to effectively use ReTxLP, the buffer (e.g., the jitter buffer) should be sized large enough such that the lost packet can be received and placed in the proper order before audio or video playback. Accordingly, the buffer should be able to receive packets for at least the retransmission latency determined in 1006.

As a specific example, the RTT between a first videoconference device and a second videoconference device may be determined as 100 ms. Accordingly, the buffer size should be greater than 100 ms in order to account for processing times on either end (e.g., to request the lost packet, to receive the request and retransmit the lost packet, and to receive the lost packet and place it in the proper order), so a buffer size of 120 ms may be used. Various percentages or fixed amounts of times (or other methods) may be used to calculate the necessary increase from the round trip time, e.g., 5%, 10%, 15%, 20%, 5 ms, 10 ms, 20 ms, 25 ms, 50 ms, 100 ms, etc.

Note that the method described above may be performed at various times according to various embodiments. For example, the buffer size may be determined initially, e.g., before or at the beginning of the videoconference, based on a determined retransmission latency that will be used in the videoconference. Alternatively, the buffer size may be determined based on a worst-case retransmission rate (e.g., at least up to a threshold, such as 250 ms, where real time communication begins to degrade) so that the buffer can accommodate any feasible retransmission used in the videoconference. In further embodiments, the buffer may be resized each time the retransmission latency is determined; thus, the method may be performed dynamically, during run-time, as the retransmission latency rate is determined. The method may determine the retransmission latency periodically (e.g., every few seconds) to determine if the buffer should be resized, or may be performed in response to stimulus, e.g., in response to a request to initiate ReTxLP.

Note also that the method described above may be performed for individual pairs of videoconferencing devices or may be applied to all videoconferencing devices in the videoconference. Thus, according to various embodiments, the retransmission latency and/or buffer size may be determined for each of a plurality of different pairs of devices, or the retransmission latency and/or buffer size may be determined for all communications (or at least for communication between more than two devices) within the videoconference. For example, the worst retransmission time may be used to determine the buffer size for multiple videoconferencing devices in the videoconference. Additionally, the method may be performed by any videoconferencing device involved in the communication, including the sending videoconferencing device, the receiving videoconferencing device, and/or any other videoconferencing device involved in the videoconference (e.g., the MCU).

Thus, by modifying the buffer size based on the retransmission latency, ReTxLP may be more effectively used to recover lost packets in a videoconference.

Note that the methods of FIGS. 8 and 10 may be combined (e.g., where FEC and ReTxLP is used at the same time). In such instances, the higher buffer size may be used, to ensure proper operation for both packet loss correction methods.

Figure 11:
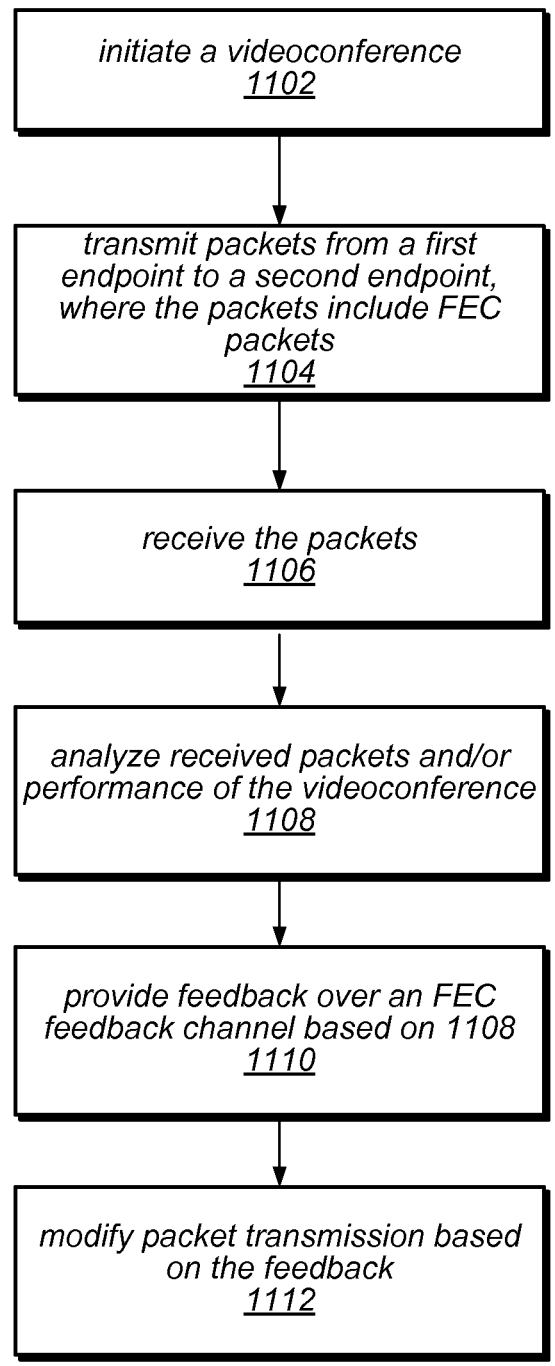
FIG. 11 is a flowchart diagram illustrating an embodiment of a method for using an FEC feedback channel during a videoconference.

FIG. 11—Use of FEC Feedback Channel During a Videoconference

FIG. 11 illustrates a method for using an FEC feedback channel during a videoconference. The method shown in FIG. 11 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 1102, a videoconference may be initiated or performed between a plurality of participants via respective videoconference endpoints, and optionally an MCU, as described above, e.g., in 402.

During the videoconference, in 804, packets (e.g., RTP packets which encode video) may be transmitted from a first videoconferencing device (e.g., a first endpoint) to a second videoconferencing device (e.g., a second endpoint). Note that the transmitted packets may include FEC packets. Thus, in some embodiments, in 704, FEC may be used to correct packet loss (e.g., from a first endpoint to a second endpoint) in the videoconference. The use of FEC may be initiated under any of various circumstances, such as those described above regarding FIG. 4.

In 1106, the second videoconferencing device may receive the packets.

In 1108, the second videoconferencing device may analyze the received packets and/or the performance of the videoconference and may provide feedback to the first videoconferencing device via an FEC feedback channel. For example, as described in FIG. 7 above, the second videoconferencing device may provide feedback regarding whether FEC should be performed by the first videoconferencing device.

Additionally, or alternatively, micro data regarding packet loss may be provided via the FEC feedback channel. Since each network is unique in terms of packet loss, analysis of the kind of error experienced may be important in deciding the redundancy required for FEC recovery. For example, knowing there is a 2% packet loss does not identify much beyond the fact that 2 in 100 packets get lost. But further analysis could reveal that these are 2 consecutive packets, or also that the loss is of 4 consecutive packets over 200 packets. This kind of micro data may be used to adjust the redundancy associated with FEC. Accordingly, in 810, such data may be provided over the FEC feedback channel.

The FEC feedback channel may use RTCP APP messages as the conduit. Using this channel the receiver can explicitly ask the sender to switch on/off FEC, change the FEC window size, etc.

In alternative embodiments, RTCP receiver reports may be used at the side of the sender (the first videoconferencing device) to determine such decisions. However, in practice, the FEC feedback channel described above works in a more efficient manner since RTCP receiver reports have more latency associated with them. Additionally, the RTCP receiver reports have no way to indicate how many packets were recovered courtesy the FEC module at the second videoconferencing device.

In 1112, the first videoconferencing device may modify its behavior or transmission of packets based on the feedback received in 1108.

Figure 12:
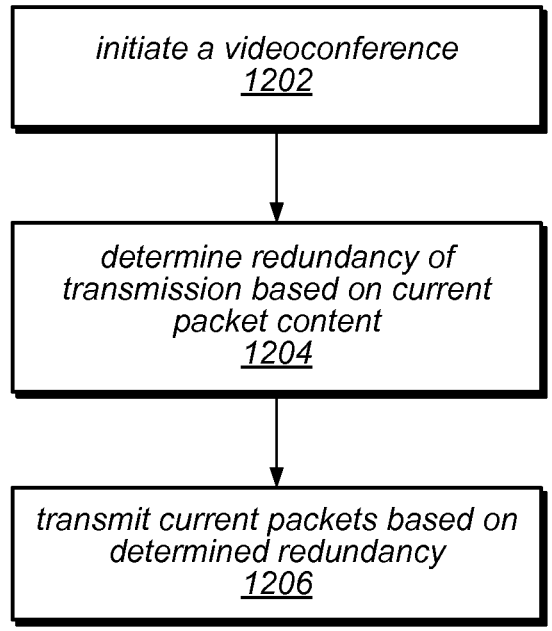
FIG. 12 is a flowchart diagram illustrating an embodiment of a method for dynamically adjusting redundancy (e.g., FEC packet rates) based on packet content.

FIG. 12—Dynamic Redundancy Based on Packet Content

FIG. 12 illustrates a method for dynamically adjusting redundancy (e.g., FEC packet rates) based on packet content. The method shown in FIG. 12 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 1202, a videoconference may be initiated or performed between a plurality of participants via respective videoconference endpoints, and optionally an MCU, as described above, e.g., in 402.

In 1204, a transmitting videoconferencing device (e.g., endpoint) may determine an amount of redundancy (e.g., an FEC window size) to be used based on current packet content. For example, since the loss of video packets that are a part of a video intra frame (i-frame) have a greater effect on the video quality, such packets may be provided with higher redundancy. Said another way, video I frames, which are intra coded frames that are used as reference frames for other frames, merit better protections than the packets that are the part of a video p-frame. In one embodiment, the FEC window size may be increased for more important packets (e.g., those containing the i-frames and/or the long term i-frames). As one specific example, if for the normal p-frames one FEC is sent every 15 packets, for the i-frames, an FEC may be sent every 5 packets.

In 1206, the transmitting videoconferencing device may transmit the packets with the determined redundancy. Note that 1204 and 1206 may be performed a plurality of times throughout the videoconference, e.g., in a dynamic fashion.

Figure 13:
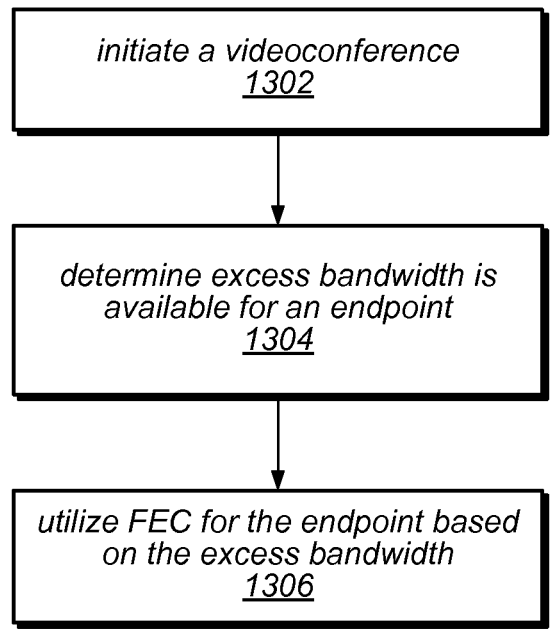
FIG. 13 is a flowchart diagram illustrating an embodiment of a method for using spare bandwidth for FEC during a videoconference.

FIG. 13—Using Spare Bandwidth During a Videoconference

FIG. 13 illustrates a method for using spare bandwidth for FEC during a videoconference. The method shown in FIG. 13 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 1302, a videoconference may be initiated or performed between a plurality of participants via respective videoconference endpoints, as described above, e.g., in 402. The videoconference may be performed at a certain bit rate, e.g., based on the endpoint with the lowest available bitrate, e.g., at the least bandwidth supported by all of the endpoints. Thus, an MCU may transmit videoconference information to the participating endpoints at the bitrate.

In 1304, the method may determine that a first videoconferencing device (e.g., endpoint) may have excess bandwidth available. Thus, during the videoconference, the MCU may transmit the videoconference information to the first videoconferencing device at a bit rate for less than is available to the first videoconferencing device.

In 1306, FEC may be utilized for the first videoconferencing device based on the determination in 1304. For example, FEC may be used at a level of overhead (e.g., FEC window size) which utilizes (e.g., matches) the available bandwidth. Accordingly, the excess bandwidth available to the first videoconferencing device may be utilized to ensure that the first videoconferencing device receives lower error (e.g., error free) videoconferencing information. Stated another way, an increased amount of FEC may be utilized to take advantage of the excess, unused bandwidth of the first videoconferencing device.

Embodiments of a subset or all (and portions or all) of the above may be implemented by program instructions stored in a memory medium or carrier medium and executed by a processor.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for determining buffer size based on forward error correction (FEC) rate, comprising:
   determining an FEC rate used in a videoconference, wherein the FEC rate specifies a frequency of FEC packets in a packet stream transmitted from a first videoconferencing device to a second videoconferencing device;
   automatically determining a buffer size of a buffer of the second videoconferencing device based on the FEC rate;
   receiving a plurality of packets from the first videoconferencing device, including at least one FEC packet;

reconstructing at least one lost packet using the at least one FEC packet, wherein the buffer size allows for said reconstructing; and providing playback of the plurality of packets and the at least one lost packet.

2. The method of claim 1, wherein said automatically determining the buffer size comprises:

determining a first number of FEC packets over a second number of data packets;

determining the buffer size using the first number of FEC packets and the second number of data packets, wherein the buffer size is greater than the sum of the first number and the second number.

3. The method of claim 2, wherein the buffer size is at least 10% greater than the sum of the first number and the sum of the second number.

4. The method of claim 1, further comprising:

performing said determining the FEC rate and said automatically determining the buffer size a plurality of times during a videoconference.

5. The method of claim 1, wherein said determining the FEC rate and said automatically determining the buffer size is performed in response to initiation of FEC between the first videoconferencing device and the second videoconferencing device.

6. The method of claim 1, wherein the packet stream comprises video packets, and wherein the buffer is a jitter buffer for video packets.

7. The method of claim 6, wherein said receiving the plurality of packets is performed to the jitter buffer, wherein the FEC packets are not stored in a separate FEC buffer.

8. The method of claim 1, wherein video frames in the packet stream are transmitted over a larger number of packets than that required without use of FEC, wherein the transmission of video frames over the larger number of packets reduces packet loss recovery time.

9. The method of claim 8, wherein the number of packets per video frame is based on the automatically determined buffer size.

10. The method of claim 8, wherein the number of packets per video frame is based on a video latency of the second videoconferencing device.

11. A non-transitory, computer-accessible memory medium storing program instructions for determining buffer size based on forward error correction (FEC) rate, wherein the program instructions are executable to:

determine an FEC rate used in a videoconference, wherein the FEC rate specifies a frequency of FEC packets in a packet stream transmitted from a first videoconferencing device to a second videoconferencing device;

automatically determine a buffer size of a buffer of the second videoconferencing device based on the FEC rate;

wherein the second videoconferencing device is configured to:

receive a plurality of packets from the first videoconferencing device, including at least one FEC packet;

reconstruct at least one lost packet using the at least one FEC packet, wherein the buffer size allows for said reconstructing; and provide playback of the plurality of packets and the at least one lost packet.

12. The non-transitory, computer-accessible memory medium of claim 11, wherein said automatically determining the buffer size comprises:

determining a first number of FEC packets sent over a second number of data packets;

determining the buffer size using the first number of FEC packets and the second number of data packets, wherein the buffer size is greater than the sum of the first number and the second number.

13. The non-transitory, computer-accessible memory medium of claim 12, wherein the buffer size is at least 10% greater than the sum of the first number and the sum of the second number.

14. The non-transitory, computer-accessible memory medium of claim 11, wherein the program instructions are further executable to:

perform said determining the FEC rate and said automatically determining the buffer size a plurality of times during a videoconference.

15. The non-transitory, computer-accessible memory medium of claim 11, wherein said determining the FEC rate and said automatically determining the buffer size is performed in response to initiation of FEC between the first videoconferencing device and the second videoconferencing device.

16. The non-transitory, computer-accessible memory medium of claim 11, wherein the packet stream comprises video packets, and wherein the buffer is a jitter buffer for video packets.

17. The non-transitory, computer-accessible memory medium of claim 16, wherein said receiving the plurality of packets is performed to the jitter buffer, wherein the FEC packets are not stored in a separate FEC buffer.

18. The non-transitory, computer-accessible memory medium of claim 11, wherein video frames in the packet stream are transmitted over a larger number of packets than that required without use of FEC, wherein the transmission of video frames over the larger number of packets reduces packet loss recovery time.

19. The non-transitory, computer-accessible memory medium of claim 18, wherein the number of packets per video frame is based on the automatically determined buffer size.

20. The non-transitory, computer-accessible memory medium of claim 18, wherein the number of packets per video frame is based on a video latency of the second videoconferencing device.

* * * * *

UNITED STATES PATENT AND TRADEMARK OFFICE
CERTIFICATE OF CORRECTION

PATENT NO. : 8,502,859 B2
APPLICATION NO. : 13/090927
DATED : August 6, 2013
INVENTOR(S) : Kamath et al.

Page 1 of 1

It is certified that error appears in the above-identified patent and that said Letters Patent is hereby corrected as shown below:

Title page:

Please add this paragraph before the heading Prior Publication Data:

-- (30) Foreign Application Priority Data
April 27, 2010        (IN)    ................................    1003/DEL/2010 --.

Signed and Sealed this
Fifteenth Day of October, 2013

Teresa Stanek Rea
*Deputy Director of the United States Patent and Trademark Office*